(12) United States Patent
Liu

(10) Patent No.: US 9,231,489 B2
(45) Date of Patent: Jan. 5, 2016

(54) POWER ADAPTOR

(75) Inventor: Kuan-Lin Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 282 days.

(21) Appl. No.: 13/608,405

(22) Filed: Sep. 10, 2012

(65) Prior Publication Data

US 2013/0336027 A1    Dec. 19, 2013

(30) Foreign Application Priority Data

Jun. 19, 2012   (TW) .............................. 101121860 A

(51) Int. Cl.
| | |
|---|---|
| *H02M 1/00* | (2007.01) |
| *H01R 4/66* | (2006.01) |
| *H01R 13/648* | (2006.01) |
| *H02M 5/458* | (2006.01) |
| *H01R 13/66* | (2006.01) |
| *H01R 31/06* | (2006.01) |

(52) U.S. Cl.
CPC ........... *H02M 5/458* (2013.01); *H01R 13/6675* (2013.01); *H01R 31/065* (2013.01)

(58) Field of Classification Search
CPC ....... H02M 5/458; H02M 7/00; H02M 7/003; H02M 7/02; H02M 7/04; H02M 7/30; H02M 7/32; H02M 2001/0032; H02M 2001/007; H02M 2001/0067; H02M 2001/0074; H02M 2001/0077; H01R 13/648; H01R 13/652; H01R 13/655; H01R 31/06; H01R 31/065; H01R 13/66; H01R 13/665; H01R 13/6675
USPC ......... 363/21.04–21.18, 50–58, 89, 125–130, 363/144–146, 15–26, 37, 44–48, 106–109; 323/222–226, 271–278, 282–287, 351, 323/205–211; 439/620.01, 675, 669, 439/92–109, 620.21–620.23, 668; 324/764.01; 713/300–340
See application file for complete search history.

(56) References Cited

U.S. PATENT DOCUMENTS

| | | | |
|---|---|---|---|
| 5,652,825 A | 7/1997 | Schmider et al. | |
| 5,920,466 A * | 7/1999 | Hirahara | .................... 363/21.02 |
| 7,088,597 B2 * | 8/2006 | Cho | ........................... 363/21.01 |
| 7,677,929 B2 * | 3/2010 | Bradford-Stagg | ............ 439/638 |

(Continued)

FOREIGN PATENT DOCUMENTS

| | | |
|---|---|---|
| CN | 101572478 | 11/2009 |
| CN | 102055304 | 5/2011 |
| TW | M366824 | 10/2009 |
| WO | 2011/065002 | 6/2011 |

OTHER PUBLICATIONS

Taiwanese language office action dated Apr. 7, 2014.

(Continued)

*Primary Examiner* — Timothy J Dole
*Assistant Examiner* — Carlos Rivera-Perez
(74) *Attorney, Agent, or Firm* — McClure, Qualey & Rodack, LLP

(57) ABSTRACT

A power adaptor is provided. The power adaptor includes a connector, a rectifier, a filter, a regulator and a switching unit coupled between the rectifier and the filter. The connector receives an alternating current (AC) power. The rectifier provides a direct current (DC) power according to the AC power. The filter filters the DC power to generate a filtered signal. The regulator provides an output voltage according to the filtered signal. A switching state of the switching unit corresponds to the DC power.

7 Claims, 6 Drawing Sheets

(56) References Cited

U.S. PATENT DOCUMENTS

2001/0034147 A1    10/2001   Kerr, Jr. et al.
2010/0201208 A1*    8/2010   Berghegger et al. .......... 307/125
2012/0262950 A1*   10/2012   Nate et al. ...................... 363/16

OTHER PUBLICATIONS

English language translation of relevant paragraphs of Taiwan Office Action, Apr. 7, 2014.

English language translation of TW M366824 (published Oct. 11, 2009).

English language translation of CN 101572478 (published Nov. 4, 2009).

Chinese language office action dated Apr. 3, 2015, issued in Application No. 201210230048.2.

English language translation of relevant sections of office action.

\* cited by examiner

POWER ADAPTOR

CROSS REFERENCE TO RELATED APPLICATIONS

This Application claims priority of Taiwan Patent Application No. 101121860, filed on Jun. 19, 2012, the entirety of which is incorporated by reference herein.

BACKGROUND OF THE INVENTION

1. Field of the Invention

The invention relates to a power adaptor, and more particularly, to a power adaptor for preventing electric sparks.

2. Description of the Related Art

At present, a great majority electronic devices need to connect to an external power supply for power. For example, an electronic device may be inserted into a socket that is used to provide power via a power plug directly or a power adaptor.

However, electric sparks may easily occur when inserting the plug into the socket because of metallic friction between the plug and the socket and excessive instantaneous current when connecting the electronic device to the power supply. The electric sparks may not only affect normal operation of the electronic device, but also damage electronic components in the electronic device.

Therefore, a power adaptor is desired to prevent electric sparks from being generated when connecting an electronic device to a power supply.

BRIEF SUMMARY OF THE INVENTION

Power adaptors are provided. An embodiment of a power adaptor is provided. The power adaptor comprises: a first connector, receiving an alternating current (AC) power; a rectifier, providing a direct current (DC) power according to the AC power; a filter, filtering the DC power to generate a filtered signal; a regulator, providing an output voltage according to the filtered signal; and a switching unit coupled between the rectifier and the filter. A switching state of the switching unit corresponds to the DC power.

Furthermore, another embodiment of a power adaptor is provided. The power adaptor comprises a first connector, receiving an alternating current (AC) power; a rectifier, providing a direct current (DC) power according to the AC power; a filter, filtering the DC power to generate a filtered signal; a regulator, providing an output voltage according to the filtered signal; and a second connector, providing the output voltage to an electronic device when connected to the electronic device. A first ground terminal of the rectifier is coupled to second ground terminals of the filter and the regulator via the second connector and the electronic device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
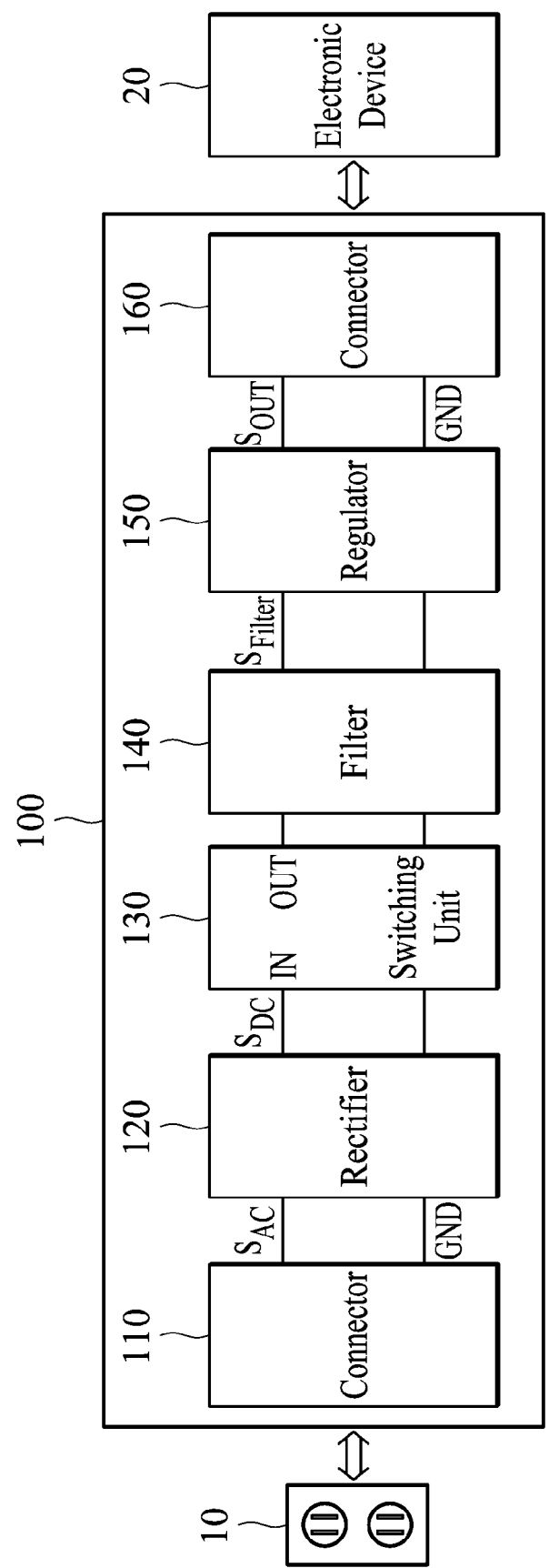
FIG. 1 shows a power adaptor according to an embodiment of the invention.

FIG. 1 shows a power adaptor 100 according to an embodiment of the invention. The power adaptor 100 comprises a connector 110, a rectifier 120, a switching unit 130, a filter 140, a regulator 150 and a connector 160. In the embodiment, the connector 110 is an input connector for connecting to a socket 10, and the connector 160 is an output connector for connecting to an electronic device 20. When the power adaptor 100 is inserted into the socket 10 that is used to provide power supply, an alternating current (AC) power $S_{AC}$ is received via the connector 110. The rectifier 120 comprises the coils for transforming the AC power $S_{AC}$ into direct current (DC) power $S_{DC}$. An input terminal IN of the switching unit 130 is coupled to the rectifier 120, and an output terminal OUT of the switching unit 130 is coupled to the filter 140, wherein a switching state (ON/OFF) of the switching unit 130 corresponds to whether the DC power $S_{DC}$ is generated by the rectifier 120. For example, when the power adaptor 100 has not been inserted into the socket 10, no DC power $S_{DC}$ is generated by the rectifier 120, thus the switching unit 130 is turned off. On the contrary, when the power adaptor 100 is inserted into the socket 10, the rectifier 120 generates the DC power $S_{DC}$ according to the AC power $S_{AC}$. Thus, in response to the DC power $S_{DC}$ being provided by the rectifier 120, the switching unit 130 is turned on. In other words, the switching unit 130 is turned off until the rectifier 120 generates the DC power $S_{DC}$ to turn on the switching unit 130. In FIG. 1, when the power adaptor 110 is inserted into the socket 10 initially, the switching unit 130 is turned off, thus preventing the DC power $S_{DC}$ from being transmitted to the filter 140 immediately. Therefore, the instant short-circuit phenomenon caused by large capacitors of the filter 140 and the regulator 150 can be prevented. Specifically, the switching unit 130 delays the timing for which the DC power $S_{DC}$ is transmitted to the filter 140, thereby preventing the generation of a large instantaneous current. Therefore, electric sparks are reduced. When the switching unit 130 is turned on, the filter 140 filters the DC power $S_{DC}$ to generate a filtered signal $S_{Filter}$. The regulator 150 provides a stable output voltage $S_{OUT}$ to the connector 160 according to the filtered signal $S_{Filter}$. In one embodiment, a voltage level of the output voltage $S_{OUT}$ is different from that of the filtered signal $S_{Filter}$. In the embodiment, the ground terminals of each internal circuit within the connector 110, the rectifier 120, the switching unit 130, the filter 140, the regulator 150 and the connector 160 are coupled to the same ground GND. Therefore, it does not matter if the connector 160 is connected to an electronic device (i.e. a loading) or not, the regulator 150 can generate the output voltage $S_{OUT}$ to the connector 160 when the power adaptor 100 is inserted into the socket 10.

Figure 2:
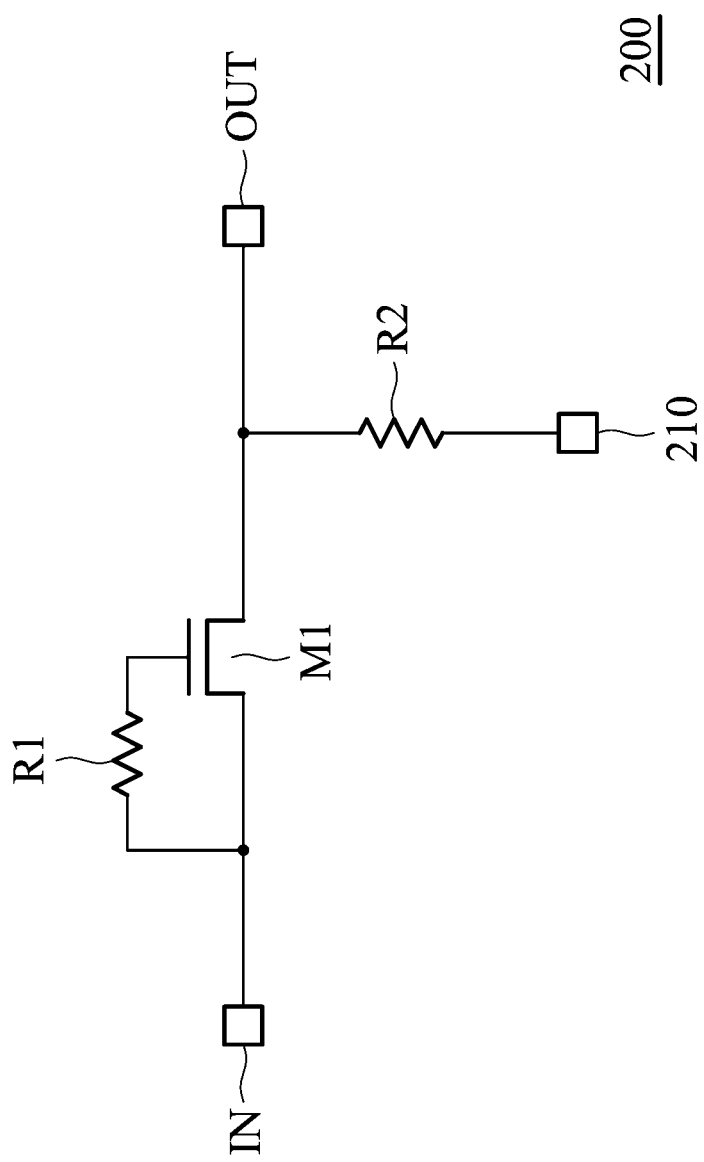
FIG. 2 shows a switching unit according to an embodiment of the invention.

FIG. 2 shows a switching unit 200 according to an embodiment of the invention. Referring to FIG. 1 and FIG. 2 together, the switching unit 200 comprises a transistor M1 and the resistors R1 and R2. The transistor M1 is coupled between the input terminal IN and the output terminal OUT. In the embodiment, the transistor M1 is an NMOS transistor. The resistor R1 is coupled between the input terminal IN and a control gate of the transistor M1, and the resistor R2 is coupled between the output terminal OUT and an internal ground terminal 210. When the rectifier 120 provides the DC power $S_{DC}$ to the switching unit 200, the control gate of the transistor M1 receives the DC power $S_{DC}$ via the resistor R1. Thus, the transistor M1 is turned on, so that the DC power $S_{DC}$ from the rectifier 120 is transmitted to the filter 140. Therefore, according to the embodiment of the invention, electric sparks are prevented by using the switching unit 200 to delay the timing of large instantaneous current occurrences (i.e. the timing for when the power adaptor 100 is inserted into the socket 10 is early than the timing of large instantaneous current occurrences).

Figure 3:
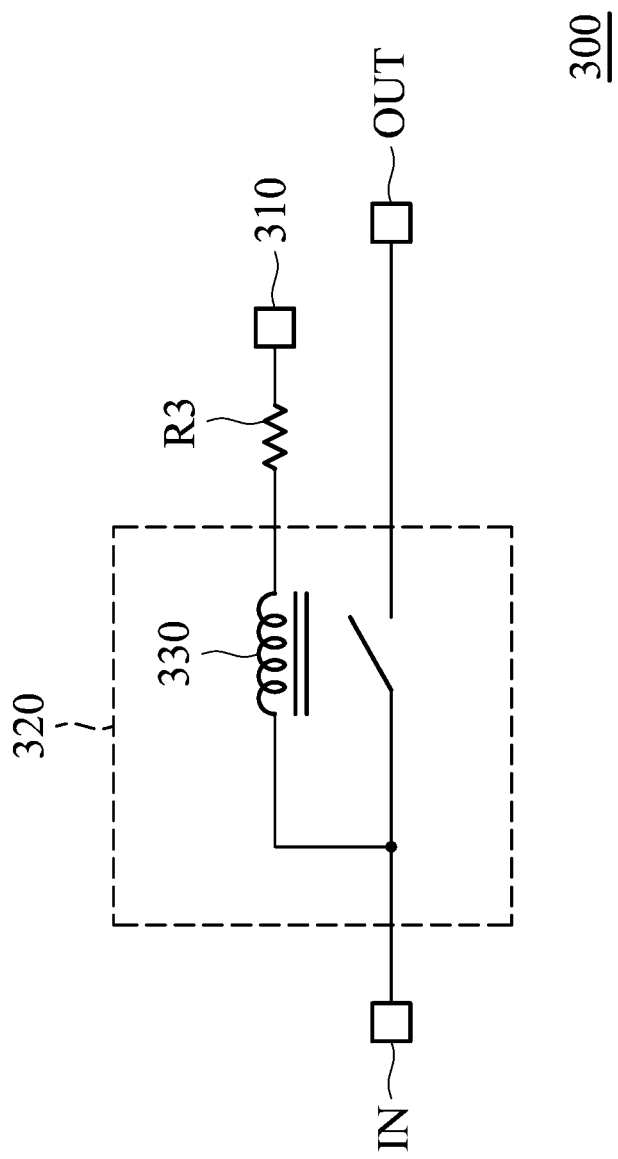
FIG. 3 shows a switching unit according to another embodiment of the invention.

FIG. 3 shows a switching unit 300 according to another embodiment of the invention. Referring to FIG. 1 and FIG. 3 together, the switching unit 300 comprises a relay 320. The relay 320 is coupled between the input terminal IN and the output terminal OUT, wherein an electromagnet 330 of the relay 320 is coupled between the input terminal IN and a resistor R3, and the resistor R3 is coupled between the electromagnet 330 and an internal ground terminal 310. When the rectifier 120 provides the DC power $S_{DC}$ to the switching unit 300, the electromagnet 330 of the relay 320 is active. Thus, a switch of the relay 320 is turned on, so that the DC power $S_{DC}$ from the rectifier 120 is transmitted to the filter 140. Therefore, according to the embodiment of the invention, electric sparks are prevented by using the switching unit 300 to delay the timing of large instantaneous current occurrences (i.e. the timing that the power adaptor 100 is inserted into the socket 10 is early than the timing of large instantaneous current occurrences).

Figure 4:
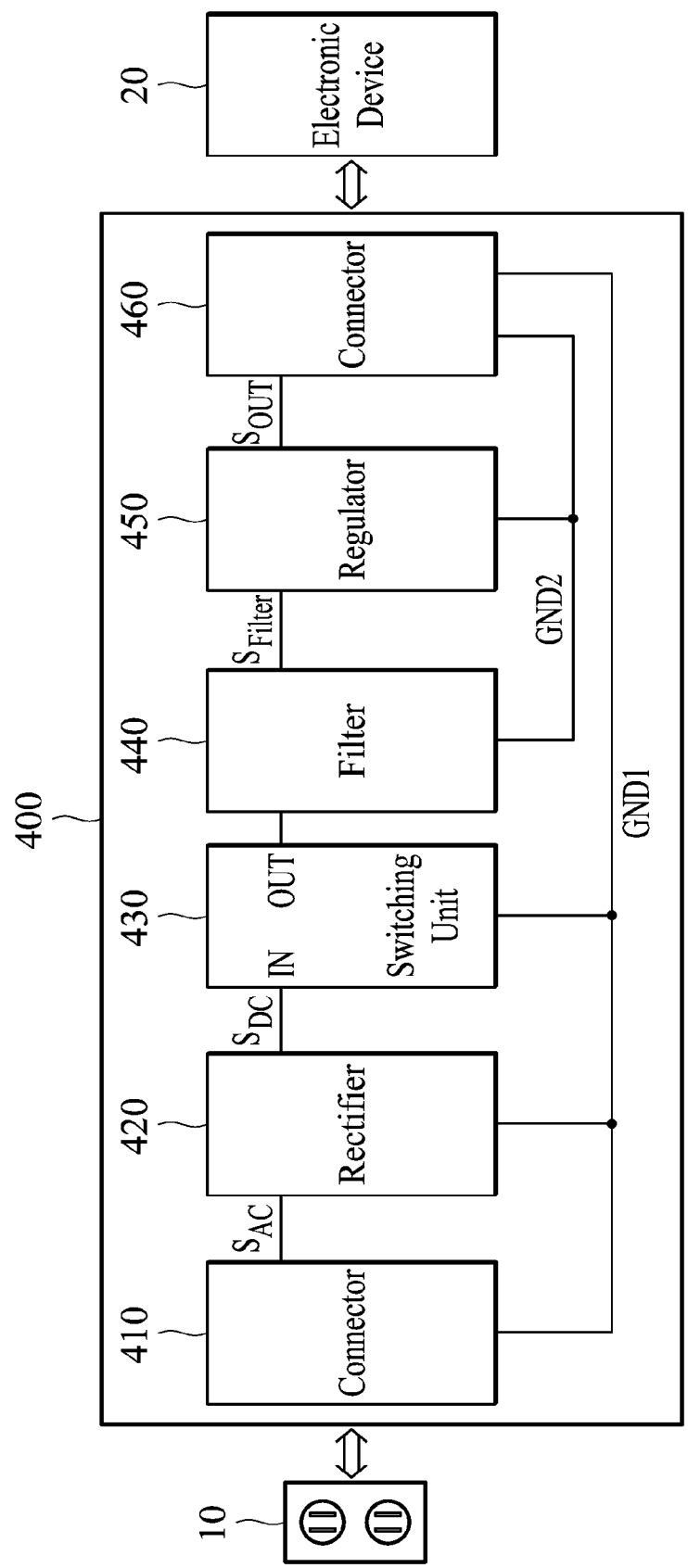
FIG. 4 shows a power adaptor according to another embodiment of the invention.

FIG. 4 shows a power adaptor 400 according to another embodiment of the invention. The power adaptor 400 comprises a connector 410, a rectifier 420, a switching unit 430, a filter 440, a regulator 450 and a connector 460. Similarly, the connector 410 is an input connector for connecting to the socket 10, and the connector 460 is an output connector for connecting to the electronic device 20. As described above, an input terminal IN of the switching unit 430 is coupled to the rectifier 420, and an output terminal OUT of the switching unit 430 is coupled to the filter 440, wherein a switching state (ON/OFF) of the switching unit 430 corresponds to whether the DC power $S_{DC}$ is generated by the rectifier 420. It is to be noted, that the internal ground terminals of the connector 410, rectifier 420 and the switching unit 430 are coupled to a ground GND1, and the internal ground terminals of the filter 440 and the regulator 450 are coupled to a ground GND2. In addition, the ground GND1 and the ground GND2 are both coupled to the connector 460. In the embodiment, the ground GND1 is electrically separated from the ground GND2 when the connector 460 is not connected to the electronic device 20, such that the filter 440 and the regulator 450 are unable to operate normally (i.e. supply power can not be applied to the filter 440 and the regulator 450), thereby the output voltage $S_{OUT}$ will not be generated. Therefore, when the power adaptor 400 is inserted into the socket 10 but not connected to the electronic device 20, power consumption of the power adaptor 400 is reduced substantially to save power.

Figure 5:
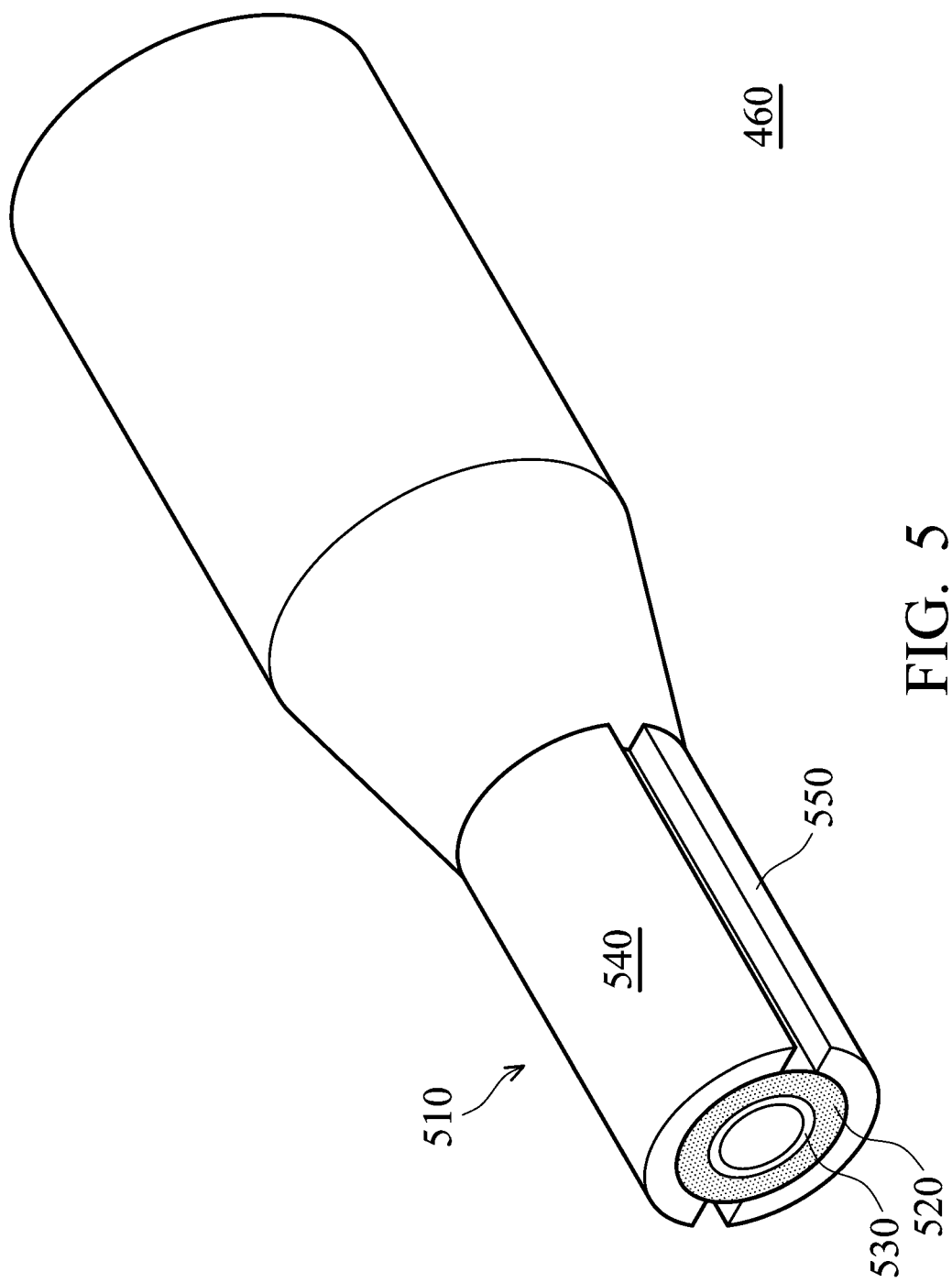
FIG. 5 shows a schematic of the connector of FIG. 4.
Figure 6:
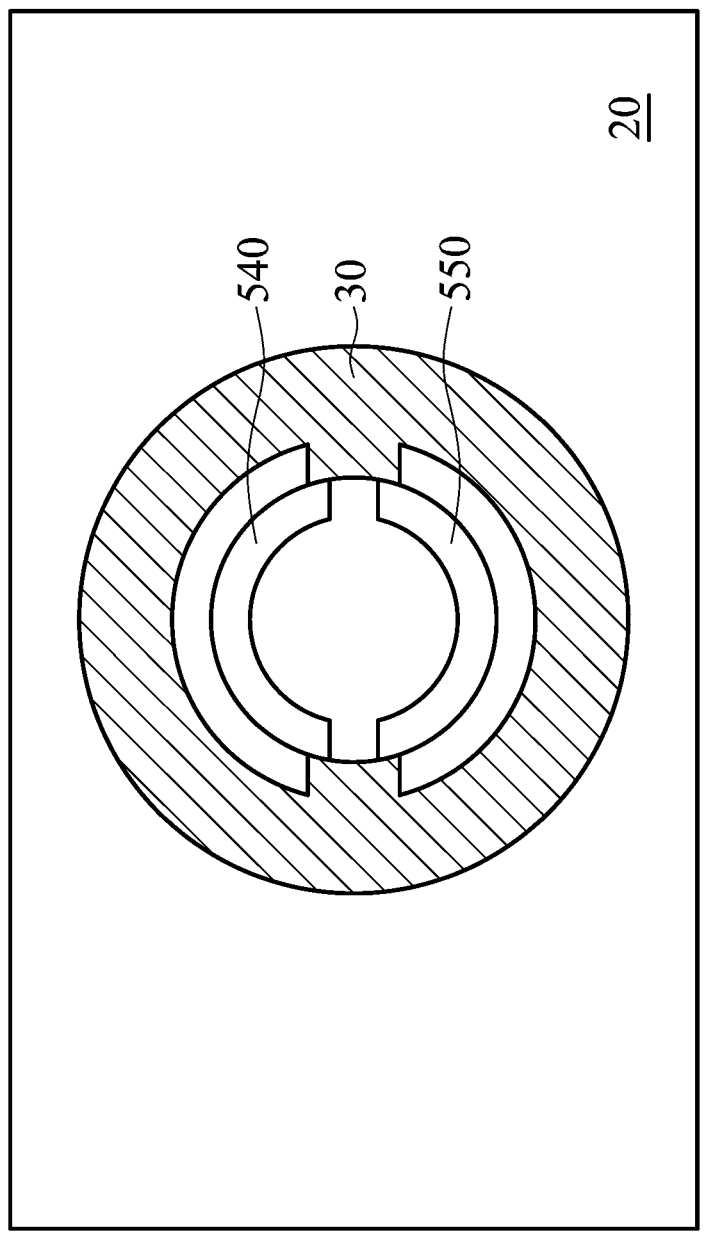
FIG. 6 shows a section schematic illustrating the connection of the terminal of FIG. 5 to the electronic device.

FIG. 5 shows a schematic of the connector 460 of FIG. 4. Referring to FIG. 4 and FIG. 5 together, the connector 460 is coupled to the electronic device 20 via a terminal 510, to provide power (i.e. the output voltage $S_{OUT}$) to the electronic device 20. The terminal 510 comprises an isolator main body 520 and the sheet metals 530, 540 and 550. The sheet metals 540 and 550 are disposed on the outer ring of the isolator main body 520, and the sheet metal 530 is disposed on the inner ring of the isolator main body 520. The sheet metal 530 is coupled to the regulator 450 of the power adaptor 400 to provide the output voltage $S_{OUT}$ to the electronic device 20. The sheet metals 540 and 550 of the terminal 510 are separate from each other, and the sheet metals 540 and 550 are coupled to the ground GND1 and the ground GND2 of the power adaptor 400, respectively. FIG. 6 shows a section schematic illustrating the connection of the terminal 510 of FIG. 5 to the electronic device 20. Referring to FIGS. 4, 5 and 6 together, when the terminal 510 of FIG. 5 is inserted into the electronic device 20, a metal spring 30 of the electronic device 20 will contact the sheet metals 540 and 550 of the terminal 510 simultaneously, such that the sheet metals 540 and 550 are mutually electrically connected. Therefore, the ground GND1 and the ground GND2 of the power adaptor 400 form the same ground loop via the metal spring 30 of the electronic device 20, so that the filter 440 and the regulator 450 can operate normally. Thus, the power adaptor 400 can provide the output voltage $S_{OUT}$ to the electronic device 20 via the sheet metal 530 of the terminal 510.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power adaptor, comprising:
    a first connector, receiving an alternating current (AC) power;
    a rectifier, providing a direct current (DC) power according to the AC power;
    a filter, filtering the DC power to generate a filtered signal;
    a regulator, providing an output voltage according to the filtered signal; and
    a second connector, providing the output voltage to an electronic device when connected to the electronic device,
    wherein a first ground terminal of the rectifier is coupled to second ground terminals of the filter and the regulator via the second connector and the electronic device,
    wherein the first ground terminal of the rectifier is separated from the second ground terminals of the filter and the regulator when the second connector is not connected to the electronic device,
    wherein the second connector comprises an isolator main body, a first sheet metal and a second sheet metal separate from the first sheet metal, wherein the first and second sheet metals are disposed on outer ring of the isolator main body, and the first sheet metal is coupled to the first ground terminal and the second sheet metal is coupled to the second ground terminals.

2. The power adaptor as claimed in claim 1, wherein the electronic device comprises a third sheet metal, wherein the third sheet metal is disposed on inner ring of the isolator main body, and the first and second sheet metals are mutually electrically connected via the third sheet metal of the electronic device when the second connector is connected to the electronic device.

3. The power adaptor as claimed in claim 2, further comprising:
a switching unit coupled between the rectifier and the filter, wherein a switching state of the switching unit corresponds to the DC power.

4. The power adaptor as claimed in claim 3, wherein the switching unit is turned off when the DC power has not been provided by the rectifier, and the switching unit is turned on when the DC power is provided by the rectifier.

5. The power adaptor as claimed in claim 4, wherein the switching unit comprises:
an N type transistor coupled between the rectifier and the filter, having a control gate; and
a resistor coupled between the control gate of the N type transistor and the rectifier,
wherein the rectifier provides the DC power to the control gate of the N type transistor via the resistor, to turn on the N type transistor, and the rectifier provides the DC power to the filter via the N type transistor when the N type transistor is turned on.

6. The power adaptor as claimed in claim 4, wherein the switching unit comprises:
a relay coupled between the rectifier and the filter, determining whether to provide the DC power to the filter according to the DC power.

7. The power adaptor as claimed in claim 1, the first ground terminal of the rectifier is electrically separated from the second ground terminals of the filter and the regulator when the second connector is not connected to the electronic device, such that the filter is unable to generate the filtered signal and the regulator is unable to provide the output voltage.

* * * * *